United States Patent

Asami

[11] Patent Number: 6,036,100
[45] Date of Patent: Mar. 14, 2000

[54] NONCONTACT IC CARD

[75] Inventor: Kazuo Asami, Hyogo, Japan

[73] Assignees: Mitsubishi Denki Kabushiki Kaisha, Tokyo; Mitsubishi Electric Semiconductor Software Corporation, Hyogo, both of Japan

[21] Appl. No.: 08/946,700

[22] Filed: Oct. 8, 1997

[30] Foreign Application Priority Data

May 13, 1997 [JP] Japan ................................. 9-122331

[51] Int. Cl.⁷ .............................................. G06K 19/07

[52] U.S. Cl. ......................... 235/492; 395/840; 395/875

[58] Field of Search ........................ 235/492; 395/825, 395/840, 872, 875

[56] References Cited

U.S. PATENT DOCUMENTS

| | | | |
|---|---|---|---|
| 5,664,157 | 9/1997 | Takahira et al. | 235/492 |
| 5,727,230 | 3/1998 | Fujioka | 395/825 |
| 5,737,571 | 4/1998 | Fukuzumi | 395/856 |
| 5,737,582 | 4/1998 | Fuzuzumi | 395/500 |

Primary Examiner—Michael G Lee
Assistant Examiner—Drew A. Dunn

[57] ABSTRACT

A noncontact IC which transmits and receives data to and from a host computer using RF signals has a buffer for storing received data temporarily and a control circuit for controlling operation of the buffer main memory thereof, wherein the control circuit starts processing data stored in the buffer only when no further data is input after a predetermined data receiving time period has elapsed from the latest data input to the buffer.

8 Claims, 7 Drawing Sheets

NONCONTACT IC CARD

BACKGROUND OF THE INVENTION

The present invention relates to a noncontact IC card for exchanging data with a host system apparatus, such as a data processing device, using a radio frequency (RF) signal or other noncontact communications medium.

DESCRIPTION OF RELATED ART

Noncontact IC cards using a radio frequency (RF) signal or other noncontact communications medium have been developed and commercially used for exchanging information with a variety of host system apparatuses. A simplified block diagram of a conventional noncontact IC card according to the prior art is shown in FIG. 8.

The noncontact IC card (simply "IC card" below) 100 communicates with a host system apparatus (reader/writer) 101 via a transmission antenna unit 102 enabling RF signal sending and receiving, a modulation circuit 103 for modulating data to be sent via transmission antenna unit 102, and a demodulation circuit 104 for demodulating data received via transmission antenna unit 102. A Universal Asynchronous Receiver/Transmitter (hereinafter UART) 105 converts serial data to parallel data, and parallel data to serial data, and a memory unit 106, which is typically an Electrically Erasable Programmable Read Only Memory (hereinafter EEPROM) device, provides data storage. A control unit 107 controls operation of memory unit 106. A rectification circuit 108 rectifies the RF signal received by transmission antenna unit 102 to supply current to the other internal components of IC card 100; rectification circuit 108 thus acts as a power supply unit for the internal circuitry of IC card 100. Note that for simplicity the connections between rectification circuit 108 and other components are omitted.

The host system apparatus 101 comprises a host computer 111, and a data reader/writer 112. The data reader/writer 112 comprises a transmission antenna unit 113 enabling RF signal sending and receiving with transmission antenna unit 102 of IC card 100, a modulation/demodulation (modem) circuit unit 114 for modulating and demodulating data during sending and receiving, and a controller 115 for controlling operation of modem circuit unit 114 based on commands from host computer 111.

The data reader/writer 112 thus communicates with IC card 100 by means of the controller 115 controlling modem circuit unit 114 according to commands received from host computer 111 to send and receive data through transmission antenna unit 113. IC card 100 receives data sent from data reader/writer 112 through transmission antenna unit 102, and demodulation circuit 104 then demodulates the received analog data to digital data using a common A/D conversion process. The demodulated data is serial data, which is then converted to parallel data by UART 105. The parallel data is then output to control unit 107. The control unit 107 next performs any of various processes specified by the command thus received from the host system apparatus 101.

When IC card 100 transmits data stored in memory unit 106 to data reader/writer 112, control unit 107 reads the data from memory unit 106 and outputs the data to UART 105. UART 105 thus converts this parallel data to serial data, modulation circuit 103 next modulates the serial data for transmission, and the data is then transmitted by transmission antenna unit 102.

The operation of control unit 107 during data receiving is described briefly below with reference to FIG. 9, a timing chart of control operation thereof.

Referring to FIG. 9, signal (a) represents the data received from the host system apparatus 101, signal (b) is a data receipt enable signal of control unit 107 enabling data receiving, and signal (c) is a data processing enable signal of control unit 107. The control unit 107 sets the data receive enable signal (b) HIGH in this example when data is received from host system apparatus 101. The data processing enable signal (c) is set apparatus to enable or disable data processing.

Each data unit received from an external host system apparatus 101 is thus processed by IC card 100 as it is received, and IC card 100 automatically terminates data receiving and switches to a transmission mode when no data is received from the external apparatus 101 for a predetermined period of time. This predetermined period of time is, in this example, a time required to receive m bytes of data. This means that when processing is interrupted due to an error occurring at the nth command received, IC card 100 has already completed processing the (n−1) command [=mth command] and may have already overwritten data previously stored to memory unit 106.

Noise and other factors can also cause IC card 100 to be constantly in a data receiving mode, thus preventing data transmission.

SUMMARY OF THE INVENTION

Therefore, an object of the present invention is to resolve the above problems by providing a noncontact IC card whereby improper overwriting of stored data can be prevented; obstruction of data transmission by factors such as noise can be prevented; reliability can be improved; and the security of data stored to memory can be improved.

To achieve the above objects, a noncontact IC card for exchanging data with a data processing device or other host system apparatus using radio frequency signals or other noncontact medium according to the present invention comprises an interface for interfacing with a host system apparatus, a memory unit for storing data, a submemory unit for temporarily storing data, and a control circuit unit for controlling operation of the submemory unit and controlling operation of the memory unit according to a command input from the host system apparatus via the interface. The control circuit unit stores data input from the interface to the submemory unit, and processes the data stored to the submemory unit when data is not input through the interface after a particular period has elapsed after data input through the interface.

Improper overwriting of stored data is prevented by confirming that all necessary data has been received before initiating data processing and writing. Reliability is improved by avoiding obstruction of normal operation by errors and factors such as noise.

BRIEF DESCRIPTION OF THE DRAWINGS

Other objects and attainments together with a fuller understanding of the invention will become apparent and appreciated by referring to the following description and claims taken in conjunction with the accompanying drawings.

DESCRIPTION OF PREFERRED EMBODIMENTS

Figure 1:
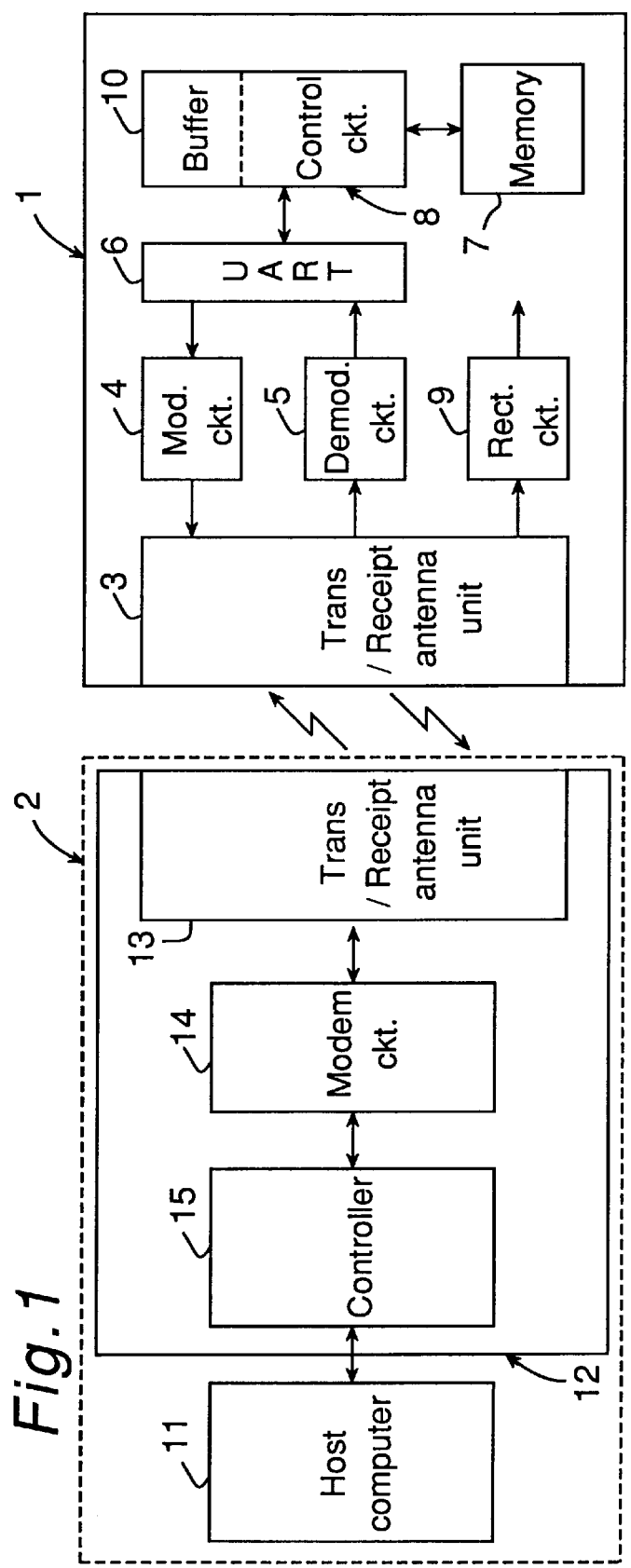
FIG. 1 is a block diagram of an IC card according to a first embodiment of the present invention.

The preferred embodiments of the present invention are described below with reference to the accompanying figures.
Embodiment 1

An IC card according to the first embodiment of the present invention is described first below with reference to FIG. 1, a block diagram thereof.

A noncontact IC card (simply "IC card" below) 1 according to the present invention communicates with a host system apparatus 2 via a transmission antenna unit 3 enabling RF signal sending and receiving, a modulation circuit 4 for modulating data to be sent via transmission antenna unit 3, and a demodulation circuit 5 for demodulating data received via transmission antenna unit 3. A UART 6 converts serial data to parallel data, and parallel data to serial data, and a memory unit 7, which is typically an EEPROM device, provides data storage.

A control circuit unit 8 controls operation of memory unit 7, and comprises an internal buffer 10 providing temporary data storage. A rectification circuit 9 rectifies the RF signal received by transmission antenna unit 3 to supply current to the other internal components of IC card 1; rectification circuit 9 thus acts as a power supply unit for the internal circuitry of IC card 1.

The transmission antenna unit 3 is connected to modulation circuit 4, demodulation circuit 5, and rectification circuit 9. The modulation circuit 4 and demodulation circuit 5 are also connected to UART 6. UART 6 is further connected to control circuit unit 8, and control circuit unit 8 is connected to memory unit 7. The rectification circuit 9 is connected to modulation circuit 4, demodulation circuit 5, UART 6, memory unit 7, and control circuit unit 8, but for simplicity the connections between the rectification circuit 9 and other components are not shown in FIG. 1.

Note, further, that the transmission antenna unit 3, modulation circuit 4, demodulation circuit 5, and UART 6 function as an interface for communicating with the host system apparatus 2, and the buffer 10 serves as the submemory unit of the claims.

The host system apparatus 2 comprises a host computer 11, and a data reader/writer 12. The data reader/writer 12 comprises a transmission antenna unit 13 enabling RF signal sending and receiving with transmission antenna unit 3 of IC card 1, a modulation/demodulation (modem) circuit unit 14 for modulating and demodulating data during sending and receiving, and a controller 15 for controlling operation of modem circuit unit 14 based on commands from host computer 11.

The host computer 11 is connected to controller 15 of reader/writer 12, the controller 15 is connected to modem circuit unit 14, and modem circuit unit 14 is connected to transmission antenna unit 13.

Thus comprised, host system apparatus 2 continuously outputs an RF signal from reader/writer 12. The transmission antenna unit 3 of IC card 1 receives this RF signal from reader/writer 12, and converts the RF signal to an electrical signal for output to demodulation circuit 5 and rectification circuit 9.

The rectification circuit 9 rectifies an electrical signal from transmission antenna unit 3 to supply current to the other internal circuit components of IC card 1. The reader/writer 12 transmits an RF signal containing the data modulated to a carrier wave when it is transmitting data to IC card 1, and outputs an unmodulated RF signal when data is not transmitted.

The controller 15 of reader/writer 12 controls operation of modem circuit unit 14 based on commands received from host computer 11, and thus controls data communication via transmission antenna unit 13. When data is transmitted from reader/writer 12 to IC card 1, reader/writer controller 15 instructs modem circuit unit 14 to modulate the data from host computer 11 according to host computer command, and causes the modulated data to then be transmitted from transmission antenna unit 13.

The transmission antenna unit 3 of IC card 1 passes the received RF signal from reader/writer 12 to the demodulation circuit 5 after first converting RF signal to an electrical signal. The demodulation circuit 5 thus demodulates the received electrical signal to extract the data, and then passes the resulting serial data signal to UART 6.

The UART 6 converts the serial data signal to a parallel data signal, which is then supplied to control circuit unit 8. The control circuit unit 8 interprets the data signal, and thus operates according to the interpreted command from reader/writer 12 to control memory unit operation.

When an ID code or other data stored to memory unit 7 is transmitted to reader/writer 12, control circuit unit 8 operates memory unit 7 to read the particular data, and passes the read parallel data to UART 6. UART 6 converts the parallel data to serial data, and outputs to modulation circuit 4. The modulation circuit 4 then modulates the serial data to a carrier wave, and outputs the modulated data signal to transmission antenna unit 3. The transmission antenna unit 3 then converts the modulated data signal to an RF signal, which it transmits to reader/writer 12.

The transmission antenna unit 13 of reader/writer 12 receives the transmitted RF signal, which is then demodulated by modem circuit unit 14, and then output through controller 15 to host computer 11.

The operation of control circuit unit 8 of IC card 1 when data is being received is described next below with reference to the timing chart shown in FIG. 2.

Figure 2:
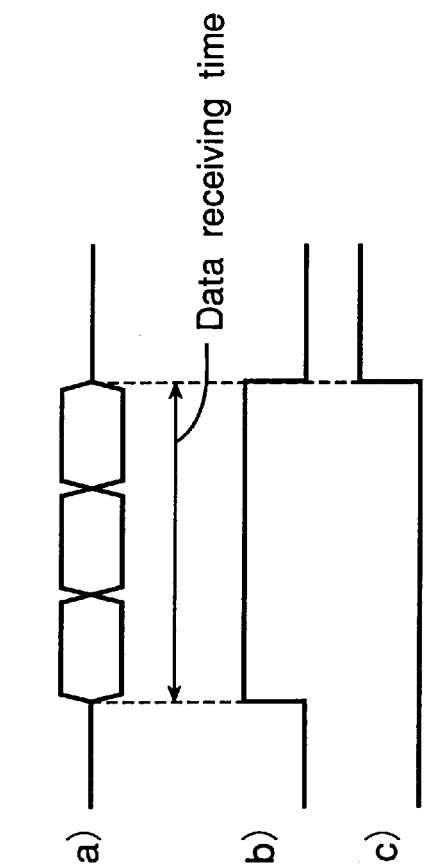
FIG. 2 is a timing chart used to describe the operation of the control circuit unit 8 shown in FIG. 1 during data receiving.

Referring to FIG. 2, signal (a) is a data signal received from host system apparatus 2 and stored at buffer 10 of control circuit unit 8. Signal (b) is a data receiving enable signal of control circuit unit 8 enabling data receiving, and signal (c) is a data processing enable signal of control circuit unit 8.

When data is received from host system apparatus 2, control circuit unit 8 sets the data receive enable signal (b) to a particular level, which is HIGH in this example, to enable data receiving for a particular period (the data receiving period) after data is received. The data processing enable signal (c) is set appropriately to enable or disable processing of the data stored at buffer 10.

When data is received from host system apparatus 2, control circuit unit 8 sets the data receive enable signal (b) HIGH for a particular data receiving period as shown in FIG. 2. During this period, control circuit unit 8 executes a particular error detection processing for the received data, and temporarily stores the data at buffer 10 if no data errors are detected. If no data is received after the data receive period, the data processing enable signal (c) is set HIGH, and the data stored at buffer 10 is processed. However, if data continues to be received after the data receive period, the data receive enable signal (b) goes LOW and a particular error processing is executed. This error processing can, for example, cause all data stored at buffer 10 to be erased, and transmit an error message to reader/writer 12 by means of UART 6, modulation circuit 4, and transmission antenna unit 3.

The operation of control circuit unit 8 when data is received is described further below with reference to the flow chart shown in FIG. 3. It should be noted that, unless otherwise stated below, all processes executed by the various steps shown in this flow chart are performed by the control circuit unit 8.

Figure 3:
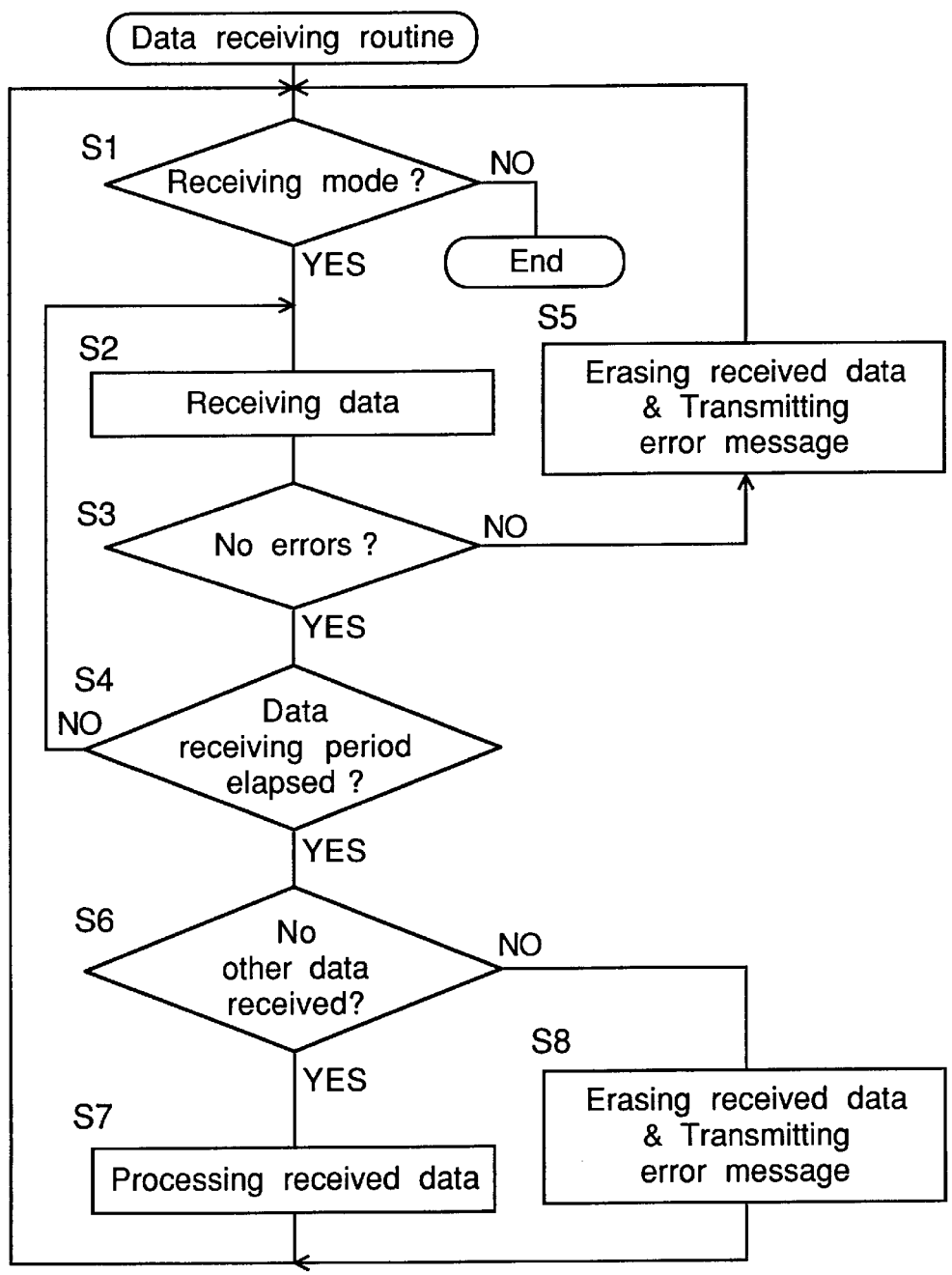
FIG. 3 is a flow chart used to describe the operation of the control circuit unit 8 shown in FIG. 1 during data receiving.

Referring to FIG. 3, it is first determined whether control circuit unit 8 is operating in a receiving mode (step S1). If control circuit unit 8 is not in a receiving mode (NO), the process terminates.

If control circuit unit 8 is in a receiving mode (YES), the data transmitted from host system apparatus 2 is received, and the data receiving enable signal (b) is set HIGH (step S2).

As data receiving proceeds, an error detection processing is executed to the received data to check for data errors (step S3). This error detection processing can be a checksum operation or other known method.

If a data error is detected (step S3 returns NO), all data stored in buffer 10 is erased, an error message is transmitted to reader/writer 12 by means of UART 6, modulation circuit 4, and transmission antenna unit 3, and control loops back to the start of the data receive routine (step S1).

If no errors are detected (step S3 returns YES), the received data is stored to the buffer 10, and it is determined whether the predetermined data receive period has elapsed (step S4).

If the data receive period has not elapsed (step S4 returns NO), control loops back to step S2, and steps S2 to S4 are repeated.

If the data receive period has elapsed (step S4 returns YES), it is detected whether additional data is received (step S6). If the data receive period has passed and no more data is received, the received data stored to the buffer 10 is processed (step S7), and control loops back to the start of the data receiving routine (step S1).

However, if the data receiving period has passed and data is still being received (transmitted) (step S6 returns NO), all data stored in the buffer 10 is erased, an error message is transmitted to reader/writer 12 by means of UART 6, modulation circuit 4, and transmission antenna unit 3, and control loops back to the beginning of the data receive routine (step S1).

Data received by an IC card 1 according to the first embodiment of the present invention is therefore not processed immediately, but is first temporarily stored to buffer 10 and only processed when data is not received after a predetermined data receive period. Furthermore, if any data is received after this data receive period, all data stored in buffer 10 is erased without being processed, and an error message is transmitted to host system apparatus 2.

This means that if an error occurs in any part of a predefined continuous data stream, processing of all data received prior to the data error is terminated. Overwriting of data to memory unit 7 can thus be prevented, and problems caused by improper overwriting of data stored to memory unit 7 can be prevented.

It is therefore possible to improve the security of data to be stored in memory unit 7, and reliability can thus be improved.

It is also possible to prevent obstruction of data transmission resulting from a continuous data receive state being set by continuous noise or other factors.

Embodiment 2

The duration of the data receive period of an IC card according to the first embodiment of the present invention can also be set to any desired value by storing a data receive period setting to the memory unit 7. An IC card so comprised is described next as the second embodiment of the present invention.

A block diagram of an IC card according to this second embodiment of the invention is identical to that of the first embodiment shown in FIG. 1 except that control circuit unit 8 is described as control circuit unit 21, and IC card 1 is therefore described as IC card 22. All other components are identical, and further description thereof is thus omitted below.

Operation of control circuit unit 21 of an IC card 22 according to this second embodiment is described next below with reference to the flow chart shown in FIG. 4.

Figure 4:
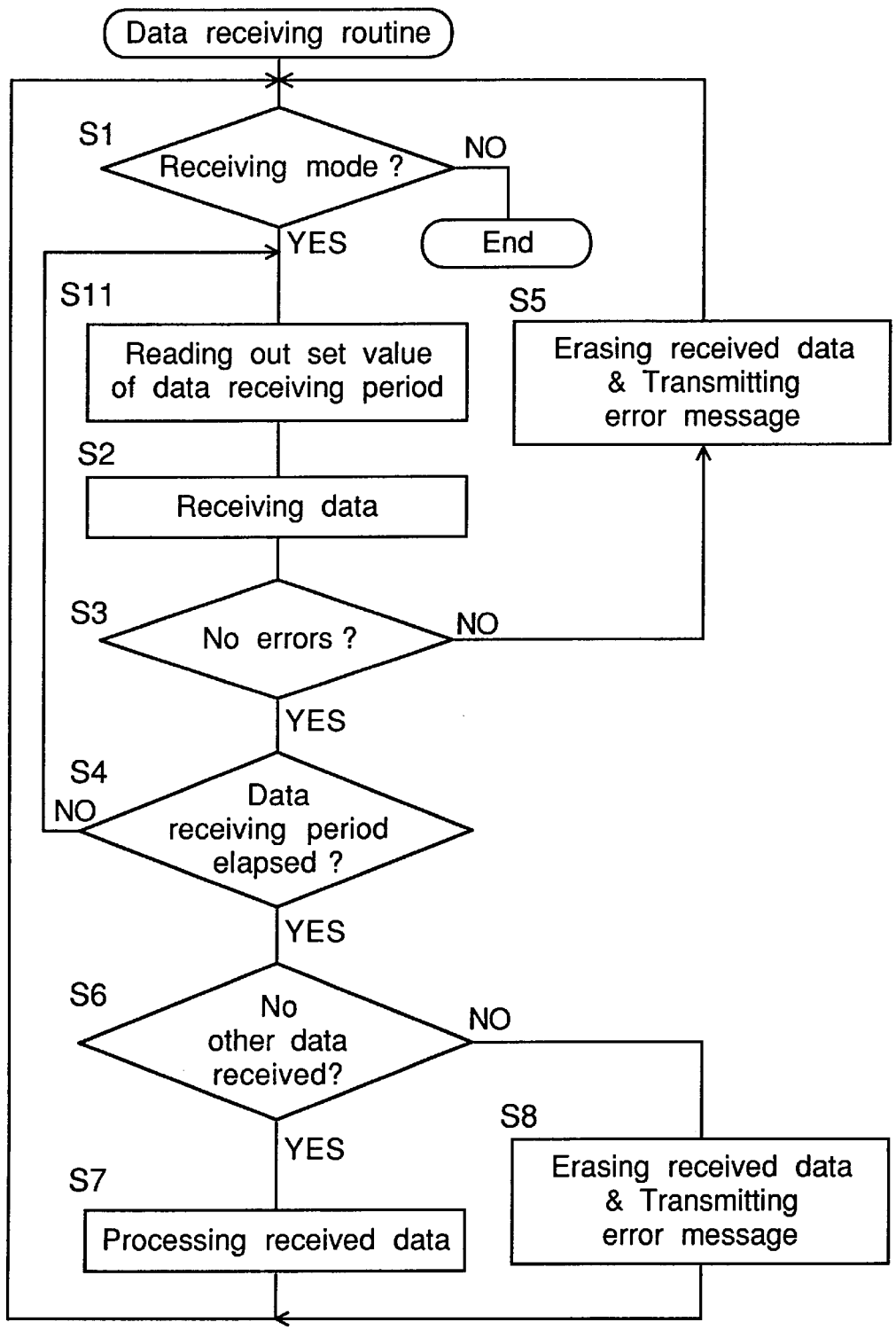
FIG. 4 is a flow chart used to describe the operation of the control circuit unit 21 in an IC card according to a second embodiment of the invention during data receiving.

It should be noted that the flow chart shown in FIG. 4 is essentially identical to that shown in FIG. 3, and steps that are the same in all ways other than being executed by the control circuit unit 21 of the second embodiment rather than by control circuit unit 8 of the first embodiment are identified using the same reference numbers. Further detailed description of those identical steps is therefore omitted below, where primarily the differences in operation are described. Note, further, that all processes executed by the various steps shown in the flow chart in FIG. 4 are performed by the control circuit unit 21 of the second embodiment unless otherwise stated below.

Operation of control circuit unit 21 of an IC card according to the second embodiment differs from control circuit unit 8 of the first embodiment by the insertion of an additional operation between checking the receiving mode (step S1) and receiving data (step S2).

More specifically, once it is determined by control circuit unit 21 that the IC card is in a data receiving mode (step S1 returns YES), the data receiving period setting is read from memory unit 7 (step S11) before actual data receiving begins (step S2).

By thus storing the length of the data receiving period in memory unit 7, the duration of the data receiving period can be set to any desired value by the IC card of this second embodiment of the present invention simply rewriting the stored setting.

In addition to the benefits derived from an IC card of the first embodiment described above, the IC card of this second embodiment can adapt to differences in the required data receiving period as the length of a data sequence transmitted from host system apparatus 2 changes, typically due to differences in application. As a result, the data communications time can be set to the shortest time required for a particular application, and the data processing time of an IC card 22 according to the present embodiment can be reduced.

Embodiment 3

The data receive period of an IC card according to the second embodiment of the present invention can be set to any desired value by storing an appropriate data receiving period setting at memory unit 7 as described above. Furthermore, it is also possible for host system apparatus 2 to append this setting to the data transmitted from host system apparatus 2 to IC card each time data is transmitted, and thereby suitably change this setting. An IC card so comprised is described next as the third embodiment of the present invention.

A block diagram of an IC card according to this third embodiment of the invention is identical to that of the first embodiment shown in FIG. 1 except that the control circuit unit 8 is described as control circuit unit 31, and IC card 1 is therefore described as IC card 32. All other components are identical, and further description thereof is thus omitted below.

The operation of control circuit unit 31 of IC card 32 when data is being received is described next below with reference to the timing chart shown in FIG. 5.

Figure 5:
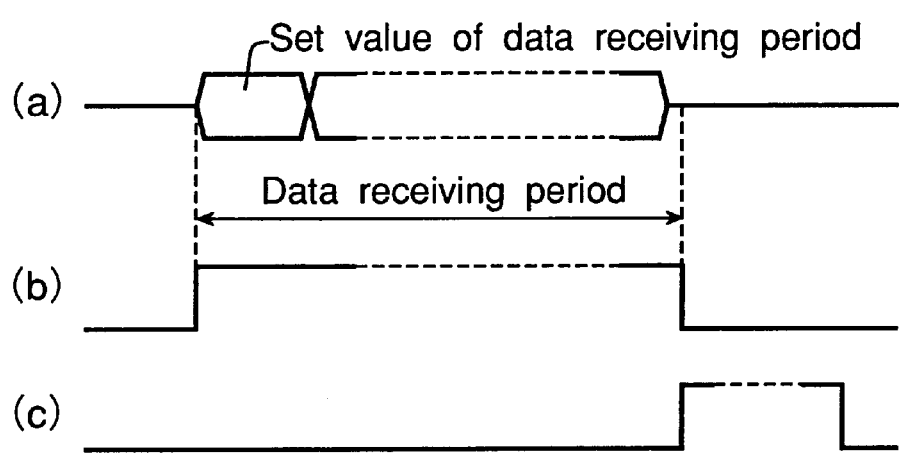
FIG. 5 is a timing chart used to describe the operation of the control circuit unit 31 in an IC card according to a third embodiment of the invention during data receiving.

Referring to FIG. 5, signal (a) is the data signal received from host system apparatus 2 and stored at buffer 10 of control circuit unit 31. Signal (b) is a data receiving enable signal of control circuit unit 31 enabling data receiving, and signal (c) is the data processing enable signal of control circuit unit 31.

When data is received from host system apparatus 2, control circuit unit 31 sets the data receiving enable signal (b) to a particular level, which is HIGH in this example, to enable data receiving for a particular period (the data receiving period) after data is received. The data processing enable signal (c) is set appropriately to enable or disable processing of the data stored at buffer 10.

The data signal (a) received from host system apparatus 2 in this embodiment differs from the data signal shown in FIG. 2 by the addition of the data receiving period setting to the beginning of the data signal stream as shown in FIG. 5. When control circuit unit 31 of IC card 32 receives this data signal (a) from host system apparatus 2, the received data is stored at buffer 10 and the data receive period setting is read from buffer 10 to set the data receiving enable signal (b) HIGH for the data receiving period specified by the transmitted setting. The control circuit unit 31 then executes a particular error detection process with respect to the received data during this data receiving period, and temporarily stores the data at buffer 10 if no data errors are detected.

If no data are received after the data receiving period, the data processing enable signal (c) is set HIGH, and the data stored at buffer 10 is processed. However, if data continues to be received after the data receiving period, the data receiving enable signal (b) goes LOW and a particular error process, such as that described in the first embodiment, is executed.

Operation of control circuit unit 31 in an IC card according to this third embodiment also follows the flow chart shown in FIG. 4, and differs only in that the data receiving period setting is received and stored at buffer 10 when the data signal is received as described above. Once the setting is read from the buffer in step S11, operation continues from step S2 as previously described. Note that all processes executed by the various steps shown in the flow chart in FIG. 4 are performed by control circuit unit 31 of the third embodiment, and further detailed description of those identical steps is therefore omitted below.

The length of the data receive period can therefore be set freely and dynamically according to the specific data being transmitted by thus transmitting the data receiving period setting from host system apparatus 2 at the time the data signal is transmitted. An IC card according to this third embodiment can therefore dynamically adapt to differences in the required data receiving period as the length of a data sequence transmitted from host system apparatus 2 changes, such as due to differences in application. As a result, the data communications time can be set to the shortest time required for a particular application, and the data processing time of IC card 32 according to the present embodiment can be reduced.

Embodiment 4

The data receiving period is set identically in the first to third embodiments above irrespective of whether data is being read from the IC card or written to the IC card. It is also possible, however, to read from without writing to memory unit 7 using a conventional method, and to use one of the methods described in the first through third embodiments above when writing data to memory unit 7. An IC card so comprised is described next below as the fourth embodiment of the present invention. Note that a conventional method exemplary of the method used in this fourth embodiment processes data received from an external host system apparatus as it is received, and terminates receiving and switches to a transmission mode when no data is received for a predetermined period of time, such as the time required to receive m bytes of data.

A block diagram of an IC card according to this fourth embodiment of the invention is identical to that of the first embodiment shown in FIG. 1 except that control circuit unit 8 is described as control circuit unit 41, and IC card 1 is therefore described as IC card 42. All other components are identical, and further description thereof is thus omitted below.

Operation of control circuit unit 41 in an IC card 42 of the fourth embodiment comprised as described in the first embodiment above when writing to memory unit 7 is explained next below.

The host system apparatus 2 in this case appends an identification (ID) code to, for example, the beginning of the transmission data, and then transmits the data signal. This ID code identifies whether the transmitted data is a command causing data stored in memory unit 7 to be overwritten, e.g., is a command writing data to memory unit 7, or is a command that does not cause data stored in memory unit 7 to be overwritten, e.g., is a command reading data from memory unit 7. The control circuit unit 41 of IC card 42 then interprets the ID code thus attached to the data signal to determine whether the received data is a command writing to memory unit 7 or not writing to the memory unit 7.

If control circuit unit 41 thus determines the received data to be a command overwriting data stored in memory unit 7, data is written to memory unit 7 as described in the first embodiment above. If the received data is a command that does not cause data stored in memory unit 7 to be overwritten, e.g., is a data read command, data is read from the memory unit 7 using a conventional method such as described above.

Operation of control circuit unit 41 of an IC card 42 according to this fourth embodiment is described next below with reference to the flow chart shown in FIG. 6.

Figure 6:
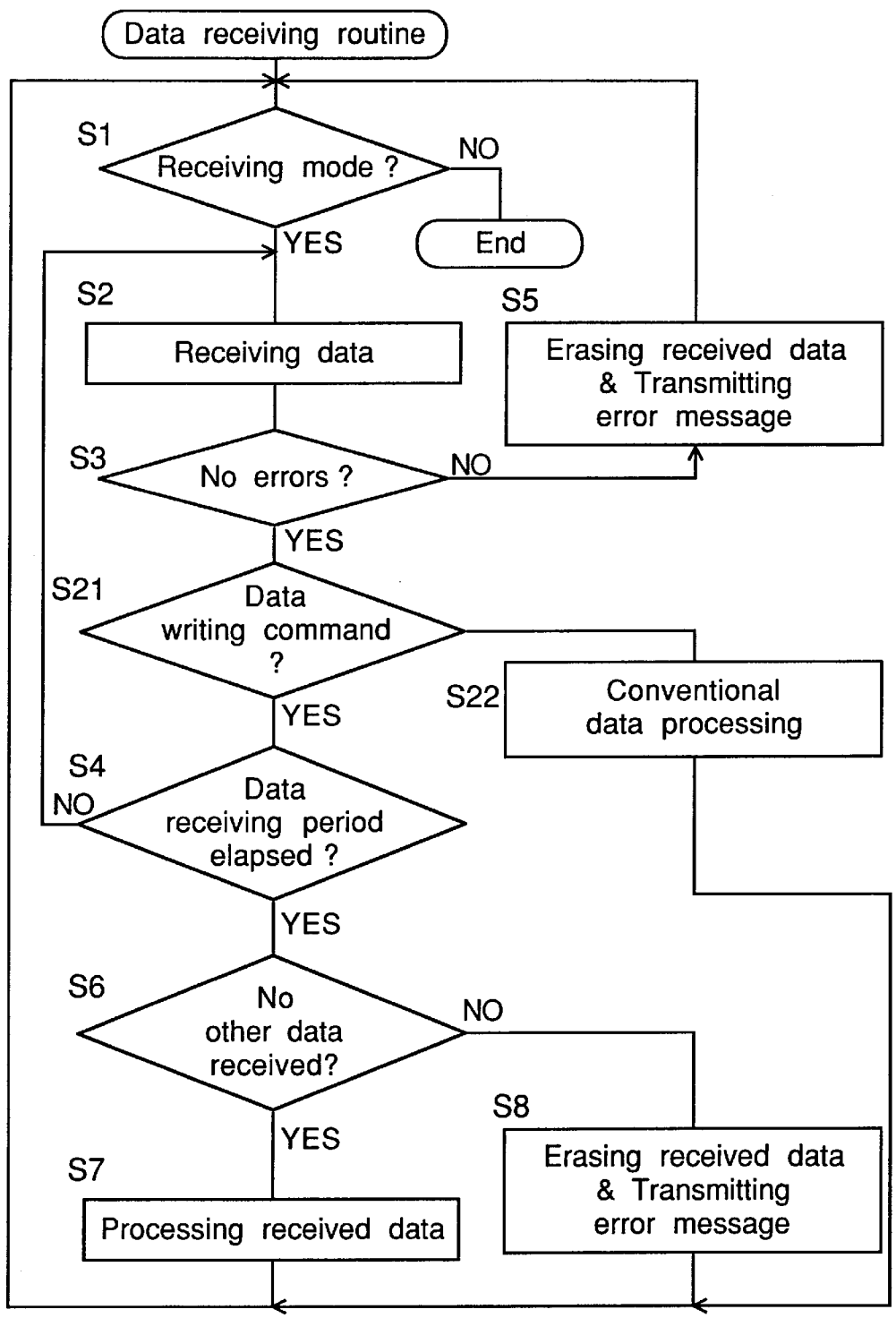
FIG. 6 is a flow chart used to describe the operation of the control circuit unit 41 in an IC card according to a fourth embodiment of the invention during data receiving.

It should be noted that the flow chart shown in FIG. 6 is essentially identical to that shown in FIG. 3, and steps that are the same in all ways other than being executed by control circuit unit 41 of the fourth embodiment rather than by control circuit unit 8 of the first embodiment are identified using the same reference numbers. Further detailed description of those identical steps is therefore omitted below, where primarily the differences in operation are described. Note, further, that all processes executed by the various steps shown in the flow chart in FIG. 6 are performed by control circuit unit 41 of the fourth embodiment unless otherwise stated below.

Referring to FIG. 6, operation of this control circuit unit 41 according to the fourth embodiment differs from control circuit unit 8 of the first embodiment by the insertion of an additional conditional test (step S21) between data error checking (step S3) and checking the data receiving period (step S4), and adding a data processing step (step S22).

More specifically, if no errors are detected in the error detection process (step S3 returns YES), control circuit unit 41 interprets the ID code to determine whether a data write command was received. If a data write command has been received, (step S21 returns YES), control steps to step S4, and proceeds thereafter as described with reference to FIG. 3.

However, if a data write command is not received, (step S21 returns NO), data is received and processed using a conventional method as described above (step S22), and the control flow thus loops back to step S1.

It should be noted that while this embodiment has been described using the method of the first embodiment during data writing, it will be obvious that the method of the second or third embodiment can be alternatively used.

By thus evaluating an ID code attached by the host system apparatus 2 to the data signal to verify whether a write command has been received before proceeding with data processing, an IC card according to this fourth embodiment improves the reliability of data stored in the IC card while enabling faster data communications. Furthermore, these benefits are achieved in addition to those attained by the first to third embodiments above.

Embodiment 5

An IC card according to the first embodiment of the present invention can be alternatively comprised to start data processing earlier and thereby finish processing data stored in buffer 10 more quickly by initiating data processing with the shortest possible delay after the last data signal is received. An IC card comprised to achieve this and described next below as the fifth embodiment of the present invention compares a particular time, such as the time required to receive m bytes of data, with the time remaining in the data receive period when no data receive signal is detected, and uses the shorter of these two times as the delay period before processing the data in buffer 10.

A block diagram of an IC card according to this fifth embodiment of the invention is identical to that of the first embodiment shown in FIG. 1 except that the control circuit unit 8 is described as control circuit unit 51, and IC card 1 is therefore described as IC card 52. All other components are identical, and further description thereof is thus omitted below.

When it is determined during the data receiving period that no data signal is being received, control circuit unit 51 of this IC card 52 compares a particular time, such as the time required to receive m bytes of data, with the time remaining in the predefined data receiving period, to select a shortest delay period. After then waiting this shortest delay period, control circuit unit 51 starts processing the data in buffer 10.

However, if data continues to be received after the data receive period has elapsed, control circuit unit 51 executes a particular error process, such as that described in the first embodiment.

Operation of control circuit unit 51 of an IC card 52 according to this fifth embodiment is described next below with reference to the flow chart shown in FIG. 7.

Figure 7:
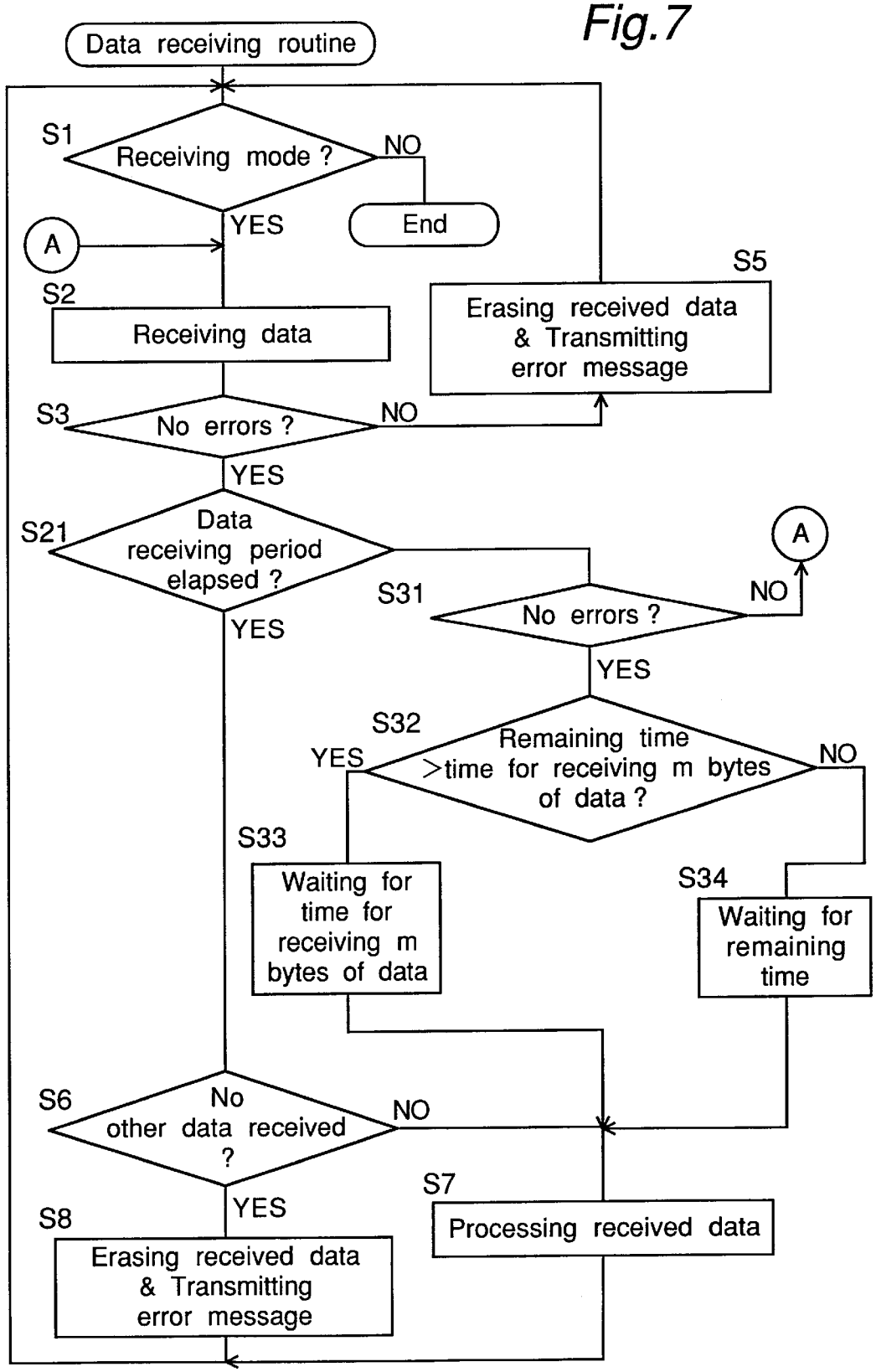
FIG. 7 is is a flow chart used to describe the operation of the control circuit unit 51 in an IC card according to a fifth embodiment of the invention during data receiving.
Figure 8:
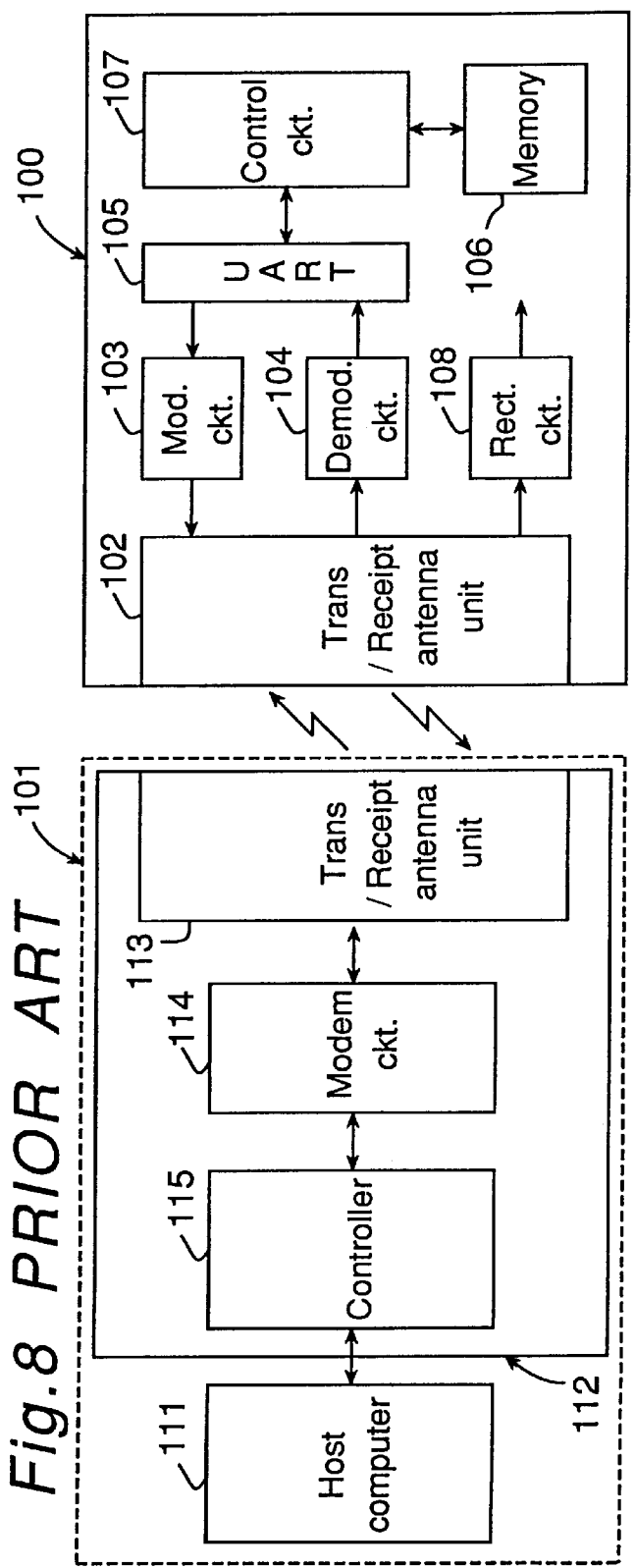
FIG. 8 is a block diagram of a noncontact IC card according to the prior art.
Figure 9:
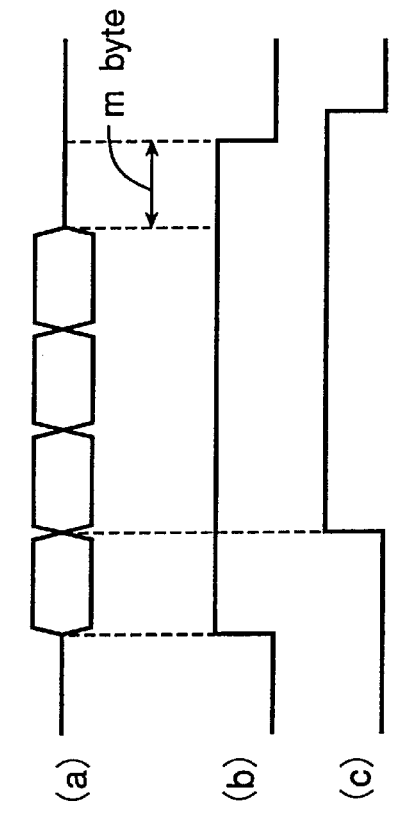
FIG. 9 is a timing chart used to describe the operation of the control unit 107 shown in FIG. 8 during data receiving.

It should be noted that the flow chart shown in FIG. 7 is essentially identical to that shown in FIG. 3, and steps that are the same in all ways other than being executed by control circuit unit 51 of the fifth embodiment are identified using the same reference numbers. Further detailed description of those identical steps is therefore omitted below, where primarily the differences in operation are described. Note, further, that all processes executed by the various steps shown in the flow chart in FIG. 7 are performed by the control circuit unit 51 of the fifth embodiment unless otherwise stated below.

Operation of this control circuit unit 51 differs by the addition of operations shown as steps S31 to S34 in FIG. 7.

More specifically, if it is determined that the data receive period has not passed, i.e., data can still be received and buffered without generating an error caused by an elapsed data receive period (step S4 returns NO), it is detected whether data is still being received (step S31). If a received data signal is detected (step S31 returns NO), the control circuit unit 51 loops back to step S2 to continue receiving the data.

However, if a received data signal is not detected at this time (step S31 returns YES), control circuit unit 51 compares a particular time, which is the time required to receive m bytes of data in this example, with the remaining time in the predefined data receiving period. If this particular time is shorter than the remaining time (step S32 returns YES), this particular time is selected as the delay period (step S33) before starting to process the buffered data (step S7). However, if the time remaining in the data receiving period is shorter than this particular time (step S32 returns NO), then this shorter remaining time is selected as the delay period (step S34) before starting to process the buffered data (step S7).

In addition to attaining the benefits of an IC card according to the first embodiment of the invention, an IC card according to this fifth embodiment of the invention thus shortens the data processing time of the IC card by minimizing the delay between the end of data receiving and the start of data processing by comparing and selecting the shorter of a particular defined delay period and the time remaining in the data receive period.

It should be further noted that, as described above, the error processing used in IC cards according to the preceding embodiments of the invention erases all data stored at buffer 10, and transmits only an error message to reader/writer 12 by means of UART 6, modulation circuit 4, and transmission antenna unit 3. However, it is alternatively possible to transmit the data stored in buffer 10 with the error message sent to the host system apparatus 2, and to then erase the data stored in buffer 10. This enables the host system apparatus to compare the data transmitted by the host system apparatus with the data received by the IC card and sent back to the host system apparatus when an error occurs. The host system apparatus can then evaluate and analyze the data sent from the IC card when an error occurs to, for example, analyze and identify noise affecting data reliability and operation.

As described in the above embodiments, an IC card of the invention stores data received through an interface to a submemory device to delay processing the received data until data is not input through the interface after waiting a predefined period from the start of data input. This makes it possible to terminate processing, or more specifically to not process, unprocessed data buffered to the submemory unit when an error is detected in part of the related data received through the interface. It is therefore possible to prevent overwriting data stored to the memory unit of the IC card when a data error is detected, and improper overwriting of data stored to the memory unit can thus be prevented.

As a result of this operation, the security of data stored in the IC card can be improved, and IC card reliability can be improved.

It is also possible to store the setting of the predefined [delay] period in the memory unit of the IC card, and to freely change this setting by rewriting the stored value. The IC card can therefore be easily adapted for use with different host system applications by changing the setting stored in memory when the required data receive period of the IC card varies because the length of the data sequence sent from the host system apparatus varies in different applications, for example. The IC card can thus operate using the shortest data communications time needed for the specific application, and data processing by the IC card can be completed in less time.

The predefined [delay] period setting stored in the memory unit of the IC card can be alternatively transmitted from the host system apparatus with the data signal to dynamically change the predefined [delay] period according to the transmitted data. The IC card of the invention can thus be even more flexibly adapted to the application to use the shortest data communications time needed and complete data processing in the shortest time.

Yet further alternatively the IC card can interpret the data received through the interface to determine whether a command instructing data to be written to the memory unit is received, and to buffer the received data only when a write command is verified. The reliability of data stored to the IC card can thus be improved, and data communications accelerated.

Data processing by an IC card of the invention can be yet further accelerated by comparing a particular delay period required to receive a particular amount of data with the time remaining in the data receive period, and selecting the shortest time as the delay period before data processing starts after data signal input stops.

Data buffered to the submemory is also deleted and an error signal is transmitted to the host system apparatus through the interface when data continues to be received after a particular period following the start of data receiving through the interface. When a data error is detected, it is therefore possible to terminate processing of any unprocessed buffered data received in the same sequence as data in which an error is detected. Overwriting data stored to the memory unit when an error occurs can thus be prevented, and data in the memory unit can be protected from improper overwriting. The security of data stored to the IC card can thus be improved, and the reliability of both data and the IC card can be improved. It is also possible to prevent the IC card from staying in a receive mode due to continuous noise, and the subsequent prevention of being able to transmit data can be avoided.

Further alternatively, the IC card of the invention can return the received data buffered to submemory with an error message to the host system apparatus when an error occurs, and then delete the buffered data. The host system apparatus can thus compare the returned data with the data transmitted by the host system apparatus to evaluate and analyze the returned data in which an error occurred. The cause of the error, including noise, can thus be analyzed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A noncontact IC card for exchanging data with a host system apparatus using radio frequency signals or other noncontact medium, comprising
    an interface for interfacing with said host system apparatus,
    a memory unit for storing data,
    a submemory unit for temporarily storing data, and
    a control circuit unit for controlling operation of said submemory unit, and controlling operation of said memory unit according to a command input from said host system apparatus via said interface,
    wherein said control circuit begins processing the data input from said interface or the data stored in said submemory unit only after confirming that a predefined receiving time has elapsed and no additional data is input from said interface when the predefined receiving time has elapsed.

2. The IC card according to claim 1, wherein a setting for the particular time period is prestored in said memory unit, and
    when data is input through said interface, said control circuit unit reads a setting of said particular time period from said memory unit, and starts measuring an elapsed time according to the read setting.

3. The IC card according to claim 1, wherein a setting for the particular time period is added to data input through said interface, and
    when data is input through said interface, said control circuit unit starts measuring an elapsed time according to the setting added to the data.

4. The IC card according to claim 1, wherein the control circuit unit interprets data input through the interface, and
    stores data input from said interface to said submemory unit, and processes the data stored at said submemory unit when data is not input through said interface after a particular time period has elapsed after data input through said interface, only when the interpreted data is a command for overwriting data stored to the memory unit.

5. The IC card according to claim 1, wherein said control circuit unit processes the data stored at said submemory unit when data is not input through said interface after waiting whichever of the following periods is shortest after data input through the interface stops:
    a time required to receive a particular amount of data, or
    a remaining time of the particular period.

6. The IC card according to claim 1, wherein said control circuit unit deletes data stored to the submemory unit and transmits a particular error signal through said interface when data continues to be input through said interface after the particular period for data input through said interface has elapsed.

7. The IC card according to any of claims 1 to 5, wherein said control circuit unit transmits data stored to the submemory unit with a particular error signal through said interface, and then deletes data stored to said submemory unit, when data continues to be input through said interface after the particular period for data input through said interface has elapsed.

8. A noncontact IC card for exchanging data with a host system apparatus using noncontact medium, comprising an interface for interfacing with said host system apparatus, a memory unit for storing data, a submemory unit for temporarily storing data, and a control circuit unit for controlling operation of said submemory unit, and controlling operation of said memory unit according to a command input from said host system apparatus via said interface, wherein said control circuit begins processing the data input from said interface or the data stored in said submemory unit only after confirming that a predefined receiving time has elapsed and no additional data is input from said interface when the predefined receiving time has elapsed.

* * * * *